United States Patent [19]

Byrne

[11] 4,393,341
[45] Jul. 12, 1983

[54] WINDSHIELD CLEANING SYSTEM

[75] Inventor: James C. Byrne, Farmington Hills, Mich.

[73] Assignee: Gulf & Western Manufacturing Company, Southfield, Mich.

[21] Appl. No.: 273,495

[22] Filed: Jun. 15, 1981

[51] Int. Cl.³ .............................................. H02P 5/00
[52] U.S. Cl. ............... 318/443; 318/DIG. 2; 318/466; 15/250.02
[58] Field of Search .................................... 15/250.02; 318/443–444, DIG. 2, 272, 466

[56] References Cited

U.S. PATENT DOCUMENTS 3,529,227 9/1970 Kearns .............................. 318/443

FOREIGN PATENT DOCUMENTS 9414 9/1979 European Pat. Off. ............ 318/443

Primary Examiner—J. V. Truhe
Assistant Examiner—A. Evans
Attorney, Agent, or Firm—Body, Vickers & Daniels

[57] ABSTRACT

A vehicle windshield cleaning system is disclosed which includes windshield wiper blades reciprocally driven by an electric motor, and an associated pump driven by an electric motor for dispensing windshield washing liquid onto a windshield to be cleaned. A manually positionable mode selector component in the electric control circuit for the blade and pump motors provides for selectively actuating the wiper blades in mist, pulse, low speed, high speed and wash modes. In the pulse mode, the blade drive motor is energized to intermittently oscillate the wiper blades through succeeding cycles with a time delay therebetween, and in the wash mode the pump motor is energized for a period of time which determines the amount of washer fluid dispensed onto a windshield. The control circuit includes a resistance-capacitance timing circuit operable in the pulse mode to determine the time delay between succeeding cycles of wiper blade oscillation, and operable in the wash mode to determine the duration of pump motor energization. The timing circuit includes an adjustable resistor, whereby both the time delay and the duration of pump motor energization can be selectively varied.

20 Claims, 8 Drawing Figures

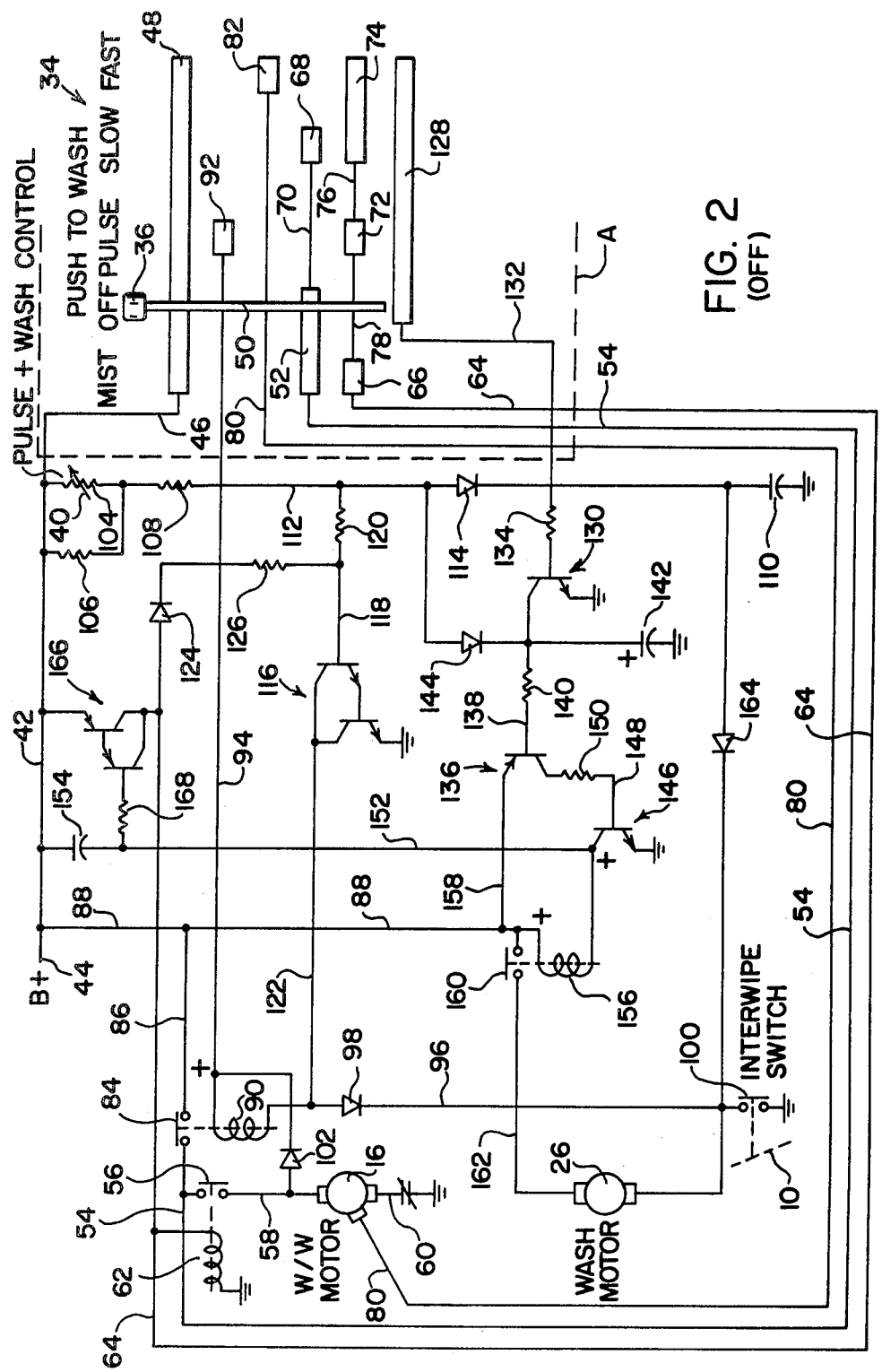
FIG. 2 (OFF)

WINDSHIELD CLEANING SYSTEM

BACKGROUND OF THE INVENTION

This invention relates to the art of vehicle windshield cleaning systems having a number of selectable modes of operation and, more particularly, to improvements in such systems enabling manual adjustment of operating characteristics in certain of the selectable modes.

Windshield cleaning systems for automotive vehicles comprising electric motor driven wiper blades are of course well known and, in connection therewith, it is likewise well known to provide motor control circuitry including a manually positionable selector component enabling the selection of any one of several different operating modes for the wiper blades. Among such modes, for example, is a mist mode in which the control circuitry operates in response to momentary actuation by the vehicle operator of the selector component to energize the blade drive motor to achieve one cycle of blade oscillation across a vehicle windshield. This mode enables cleaning of the windshield when fog, mist, light rain or other weather or road conditions are not bad enough to require repeated periodic or continuous oscillation of the wiper blades. Such selectable operating modes further include low speed and high speed blade operation modes in which the wiper blades are continuously reciprocated or oscillated and in which modes the drive motor for the wiper blades is respectively energized for low speed and high speed operation. These modes are operator selectable normally in accordance with how the vehicle is operated and the environment in which the vehicle is being operated, such as in medium and heavy rain or snowfall for example and, in these modes, the wiper blades are continuously oscillated until such time as the vehicle operator switches the selector to the off or other selectable mode positions. In more recent years, an additional mode of operation was added to most windshield cleaning systems. This additional mode is referred to as a pulse mode, in which the wiper blades are automatically, intermittently oscillated at low speed through one cycle of displacement across the vehicle windshield with a time delay between succeeding cycles. This mode provides for automatic, intermittent, oscillation of the wiper blades for maintaining the windshield clean in borderline weather and road conditions which, without this mode, would require the operator to periodically, manually activate the mist mode. In the pulse mode, each period of operation has a total duration which is determined by the time required for one oscillating cycle of the wiper blades plus the time of delay before initiation of the succeeding blade oscillating displacement. The pulse mode, like the low and high speed modes, continues once the operator has displaced the mode selector into the appropriate position and activated the switch until the operator deactivates the switch or selects another mode position.

It is also well known to provide a vehicle with a windshield wash system, which may be a separate system, used in association with the windshield cleaning system, or may be integrated into the windshield cleaning system as a windshield wash mode of a multi-mode windshield cleaning system. As a separate system, the windshield wash system may include a reservoir for storing a washing fluid or liquid, a pump means for moving the washing fluid from the reservoir to the windshield and a network of tubing for carrying the wash fluid from the reservoir to the windshield. Separate wash systems may include a manually operated pump, such as a pump operated by a foot depressed pump lever or handle, or may include a powered or driven pump operated by a switch separate from the selector switch of the windshield cleaning system. Actuation of a two part system, i.e. a washer system and a cleaning or wiper system may be two separate functions or operations, done by the vehicle operator. Integration of the washer system into the windshield cleaning system provides a composite system in which the two systems function on a coordinated basis, i.e., the wash mode of the windshield cleaning system.

In the wash mode of the windshield cleaning system the selector switch for selecting the mode of operation, is moved into the wash mode position and actuated, or otherwise actuated in the wash mode position, and a predetermined, fixed quantity of wash fluid is pumped onto the windshield and the wiper blades are oscillated at a predetermined speed continuously through at least several cycles. Oscillation of the blades, in the wash mode, serves to scrub or wipe the windshield on which the cleaning fluid has been dispensed thereby washing the outside surface of the windshield. Depending upon the switch system used, the wiper blades may stop after several cycles thereby completing the wash mode cycle or the wiper blade may continue oscillating until switched off by the operator, thereby completing the wash mode cycle. If the windshield has not been cleaned to the driver's or operator's satisfaction, the wash mode may be repeated, using another such predetermined, fixed quantity of wash fluid.

The various systems described above have disadvantages. The separate systems arrangement has the disadvantage of requiring the vehicle operator to individually operate two separate systems to effect washing of the windshield. A safety hazard is created when operating this system due to driver distraction. The washer system that includes a manually operated pump also creates a safety hazard generated by another type of driver distraction. The automatic dispensing of a fixed quantity of wash fluid creates a safety hazard generated by several factors.

Dirt, as opposed to water from mist, rain or snow, deposited on a windshield, may come from several sources such as, for example, tire spray, road dirt splashing, leaf stains, tree-sap droppping and/or smog or generally dirty air, to name just a few. Thus, dirt accumulation on a windshield may come in a wide variety of ways and degrees of accumulation. Dispensing of a preset or fixed quantity of washer fluid may be insufficient to clean the windshield during one wash mode cycle. An excessively dirty condition may require that the operator activate the wash mode cycle several times, in order to clean the windshield, which is an operator distraction and a safety hazard. Dispensing of a preset or fixed quantity of washer fluid onto a windshield that is not excessively dirty may be using an excessive amount of fluid which is wasteful and is an unwarranted expense especially where specially formulated washer fluids are concerned. The use of a fixed amount dispensing system may also use up the limited quantity of washer fluid in the reservoir which can result in early depletion of the fluid supply in the reservoir which may be hazardous in extended operation of the vehicle under adverse weather and road conditions. Further, since washer fluid may differ, from one supply to the next, i.e., one wash fluid supply in the reservoir may be a formulated mix while the next supply used may be clear water, the use of a fixed dispensing system may be very wasteful, or insufficient to do a proper windshield cleaning operation.

SUMMARY OF THE INVENTION

In accordance with the present invention, a multi-mode windshield cleaning system, of the integrated systems type is provided which includes a pulse mode and a wash mode and in which the quantity of wash fluid dispensed onto the outer surface of the windshield during the wash mode cycle is adjustable. In one embodiment of the invention the multi-mode windshield cleaning system provides for automatic adjustment of the amount of fluid used in the wash mode cycle, in accordance with the amount of dirt on the windshield. In another embodiment of the invention, the novel windshield cleaning system provides for manual adjustment of the amount of fluid used or dispensed onto the windshield during the wash mode cycle.

In providing for this unique control a novel circuit arrangement is provided which also adjusts the frequency of oscillation of the wiper blades during the pulse mode of the windshield cleaning system. While varying or adjusting the frequency of oscillation of the wiper blades during the pulse mode of the windshield cleaning system may not be novel, adjusting the frequency of oscillation of the wiper blades in the pulse mode automatically, as a function of the transparency of the windshield is novel and, the manner and circuitry by which mode control of the quantity of the wash fluid dispensed in the wash mode and control of the frequency of oscillation of the wiper blades in the pulse mode is effective, is believed novel.

More particularly, in the pulse mode the wiper blades are oscillated by an electric blade driving motor through one oscillating stroke after which the motor is de-energized for a period of time. The electric control circuit for the blade drive motor includes a variable timing arrangement for controlling the duration of the period of de-energization of the blade drive motor, and thus the length of the delay period, or frequency of oscillation. One of the embodiments provides a timing arrangement which includes manually adjustable circuitry enabling the vehicle operator to selectively control the delay period and thus the frequency of repetition of blade oscillation in the pulse mode.

Another embodiment provides for automatic adjustment of the variable timing arrangement by use of a photo-sensor which senses the amount of light interference on the windshield and varies the timing accordingly.

In the wash mode, a wash fluid pump is driven by an electric pump motor so as to dispense washer fluid onto a windshield during the duration of pump motor energization. The pump motor is energized when the manual mode selector-actuator is momentarily displaced into a wash mode position, and the variable timing arrangement mentioned above is operable in the wash mode to determine the duration of energization of the pump motor. Accordingly, it will be appreciated that the manually adjustable component for the timing arrangement enables the vehicle operator to selectively control the period of pump motor energization and thus the quantity of fluid dispensed. In the preferred embodiment, to be discussed in detail hereinafter, the control circuit includes a resistance-capacitance timing circuit operable to control both the delay period in the pulse mode and the period of energization of the pump motor in the wash mode, and includes a potentiometer manually adjustable by the vehicle operator to selectively vary these periods.

In the alternative, the adjustable potentiometer used in the manual adjust arrangement may be replaced by a photo-sensor which varies a resistance in accordance with the amount of reduction of light, caused by the presence of dirt on the windshield. This alternate arrangement provides for automatic adjustment of period of energization of the pump motor and therefore automatically controls the amount of wash fluid dispensed onto the windshield during the wash mode cycle.

It is anticipated that the above methods of adjustment, both manual and automatic, may provide for a constant speed pump motor so that the timing factor is varied to control the quantity of wash fluid dispensed. It is also anticipated that a variable speed pump motor could be used for varying the rate at which the pump is driven and thus vary, by changing the pump motor speed, the amount of fluid dispensed onto the windshield, in lieu of varying the timing factor used in association with a constant speed pump motor. The amount of power applied to the variable speed pump motor may be changed, varied or adjusted in order to vary the quantity of wash fluid dispensed onto the windshield during any given wash mode cycle.

Accordingly, it will be appreciated that in the preferred embodiment of the invention, the vehicle operator can manually adjust the time of the delay period in the pulse mode and thus provide a frequency of repetition of wiper blade oscillation most suitable for given weather conditions, by either increasing or decreasing the time delay. This advantageously minimizes operator distraction otherwise required as discussed hereinabove, and minimizes wiper blade wear and blade drive motor wear as a result of blade displacement across an insufficiently wet windshield. Likewise, the operator can manually adjust the duration of operation of the washer fluid pump motor in the wash mode so as to increase or decrease the quantity of wash fluid dispensed onto the outer surface of the windshield in accordance with the condition of the windshield, again to minimize operator distraction as mentioned hereinabove and to avoid wasting washer fluid.

Accordingly, it is an object of the present invention to provide an improved windshield cleaning system for a motor vehicle in which the amount of wash fluid dispensed onto the outer surface of the windshield during the wash mode cycle is adjustable.

Another object of the invention is to provide an improved windshield cleaning system for a motor vehicle in which the operator of the vehicle may selectively adjust the amount of wash fluid dispensed onto the outer surface of the windshield during the wash mode cycle.

A further object is to provide a windshield cleaning system for a motor vehicle in which the wash mode of the windshield cleaning system provides for automatic control over the amount of wash fluid used during the wash mode cycle.

A further object is to provide a windshield cleaning system for a motor vehicle in which the amount of wash fluid dispensed onto the surface of the windshield during the wash mode cycle is adjusted in accordance with the amount of dirt on the windshield.

Another object is the provision of a windshield cleaning system of the foregoing character enabling a more efficient operation of the system in the wash mode than heretofore possible with regard to respective conditions requiring use of the system in this mode.

Yet another object is the provision of a windshield cleaning system of the foregoing character which minimizes operator distraction with respect to use of the system in the wash mode.

A further object is the provision of a windshield cleaning system of the foregoing character which enables more economical consumption of wash fluid in connection with operation of the system in the wash mode.

Yet a further object is the provision of a windshield cleaning system of the foregoing character enabling control of the duration of the period of dispensing of washer fluid onto the windshield in the wash cycle.

A still further object is the provision of a windshield cleaning system of the foregoing character enabling control over the speed of the pump drive motor for controlling the amount of wash fluid dispensed onto the windshield in the wash mode cycle.

Yet a further object is the provision of a windshield cleaning system of the foregoing character including a wiper blade drive motor and a motor driven windshield washer fluid dispensing pump, and an electrical control circuit for the motors including a manually controllable timing arrangement operable in the wash mode to control the duration of the period of energization of the pump motor.

Still a further object is to provide a multi-mode windshield cleaning system which includes a pulse mode cycle and a wash mode cycle where the timing control for controlling the frequency of oscillation of the wiper blades in the pulse mode cycle is the same timing control which controls the duration of energization of the pump drive motor during the wash mode cycle.

BRIEF DESCRIPTION OF THE DRAWINGS

The foregoing objects, and others, will become obvious from a reading of the following description in conjunction with the accompanying drawings in which.

DESCRIPTION OF THE PREFERRED EMBODIMENT

Figure 1:
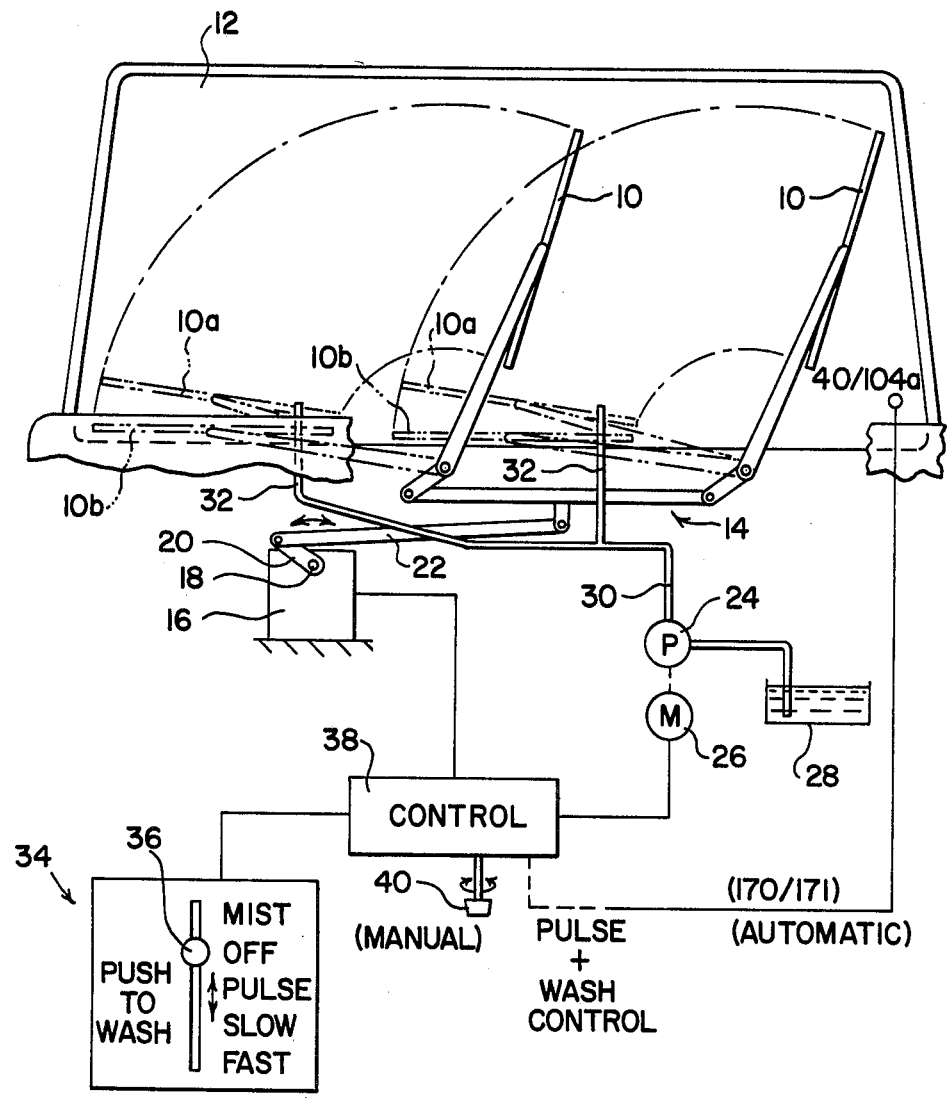
FIG. 1 is a somewhat schematic representation of a windshield wiper system according to the present invention, illustrating a blade driving arrangement, a wash fluid dispensing arrangement, the manually positionable selector for the operating modes, a manually adjustable pulse and wash control component, with an automatically adjustable pulse and wash control represented as connectable, in broken connection; and, FIG. 2 is a circuit diagram for the system with the selector/switch in the OFF position; and, FIGS. 3a, 3b, 3c, 3d and 3e illustrate the selector/switch in the MIST, PULSE, SLOW SPEED, FAST SPEED and WASH modes, respectively; and, FIG. 4 is a circuit diagram illustrating one form of automatic control circuit for varying the frequency of oscillation of the wiper blades in the pulse mode cycle and for varying the quantity of wash fluid used during the wash mode cycle.

Referring now in greater detail to the drawings, wherein the showings are for the purpose of illustrating a preferred embodiment of the invention, and not for the purpose of limiting the invention, FIG. 1 somewhat schematically illustrates a windshield cleaning system including a pair of windshield wiper blades 10 mounted for oscillating or reciprocating movement across the outer surface of a vehicle windshield 12. Blades 10 are interconnected for simultaneous oscillation by means of a drive linkage assembly 14 therebetween, and the blades are oscillated by a drive unit including a drive motor 16. The drive unit has an oscillating output shaft 18 to which a drive lever 20 is fastened, and lever 20 is connected to linkage assembly 14 by a connecting link 22, whereby it will be appreciated that energization of drive motor 16 results in oscillation of wiper blades 10. When drive motor 16 is energized, wiper blades 10 are oscillated between extended and rest positions, respectively shown by the solid line positions of the blades and the broken line positions designated by the numeral 10a in FIG. 1, and when motor 16 is de-energized the blades complete the cycle of oscillation in which they are in at that time and upon reaching the rest positions 10a are jogged into the park or off positions designated by the numerals 10b in FIG. 1. Oscillation of windshield wiper blades in this manner is well known in the art and, in this respect, it is well known that the drive motor for the blades is provided with a solenoid operated park switch which, when energized, actuates a mechanical interlock between the park switch and motor causing the motor to continue to operate so long as the solenoid is energized and causing the wiper blades to be cycled between the extended and rest positions. When the park switch solenoid is de-energized, the interlock holds the park switch closed to complete the blade oscillating cycle and, upon return of the blades to the rest position, the interlock operates to jog the blades to the park or off position.

As further seen in FIG. 1, the windshield cleaning system includes a windshield washer fluid pump 24 adapted to be driven by a pump drive motor 26 to pump windshield washer fluid from a reservoir 28 through discharge tube or line 30 and branch lines 32 onto windshield 12. As will be described in detail hereinafter, a mode selector unit 34 having a vehicle operator controlled mode selector switch 36 is operable through an electrical control circuit 38 for blade drive motor 16 and pump drive motor 26 to operate the windshield cleaning system in any one of the several selectable modes indicated in association with unit 34 in FIG. 1. As will be further explained in detail hereinafter, control circuit 38 includes a rotatable pulse and wash control component 40 which is manually operable by the vehicle operator to vary the time delay period when the system is in the PULSE mode and the vary the duration of energization of pump drive motor 26, and thus the quantity of wash fluid dispensed, when the system is in the WASH mode.

In the alternative, as shown in broken line connecting into control 38, an automatic control may be used in place of the manual control 40. If the automatic control 40/104a were connected to the control 38, the manual control 40 would be disconnected, or may be used as an override manual adjustment to the automatic adjustment of control 38. The component 40/104a represents a photo detector or photo sensor located on the inside of the windshield 12 and facing outward. The photo sensor 40/104a includes as a part thereof, a resistance which changes in accordance with the amount of light received through the windshield. As more fully described below, the automatic control will control the time delay period of the PULSE mode cycle when the windshield cleaning system is in the PULSE mode and will control the amount of wash fluid dispensed onto the windshield when the system is in the WASH mode in accordance with the amount of dirt on the outer surface of the windshield.

FIG. 2. illustrates the electrical control circuit for the windshield cleaning system and shows the movable component parts of the system in the position occupied when mode selector switch 36 is in the OFF position. With reference to FIG. 2, the control circuit includes a line 42 having an end 44 connected to a contact strip 48 in mode selector unit 34. Strip 48 is slidably engaged by conductive stem 50 of mode selector switch component 36. Mode selector unit 34 further includes a contact strip 52 engaged by stem 50 and connected by means of line 54 to one side of a normally open park switch 56, the other side of which switch is connected to windshield wiper blade motor 16 through line 58. Motor 16 has a slow speed winding connected to ground through line 60. Park switch 56 is adapted to be closed in response to energization of a park solenoid 62 connected between ground and a line 64 which is connected to a contact strip 66 in mode selector unit 34. Mode selector unit 34 further includes a contact strip 68 electrically connected with contact strip 52 and thus line 54 by means of a line 70. Contact strip 68 is adapted to be engaged by mode selector stem 50, and it will be appreciated that line 70 provides electrical continuity between contact strips 52 and 68 but does not make electrical contact with mode selector stem 50. Similarly, mode selector unit 34 includes contact strips 72 and 74 electrically connected with one another by means of a line 76 therebetween and electrically connected with contact strips 66 and thus line 64 by means of a line 78 between strips 66 and 72. Windshield wiper blade motor 16 has a fast speed winding adapted to be energized through a line 80 between the motor and a contact strip 82 in mode selector unit 34.

Figure 3A:
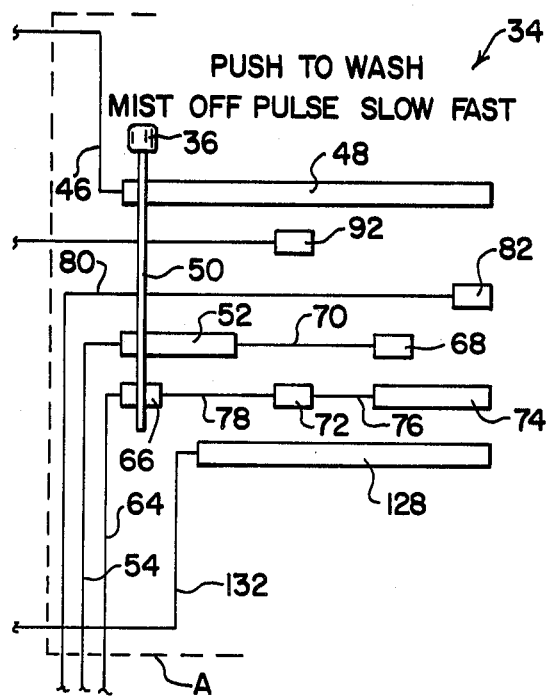
Figure 3B:
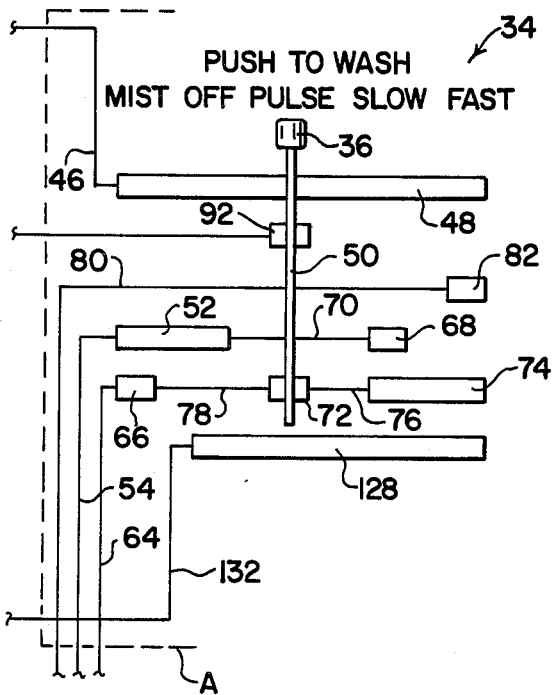

The electrical control circuit further includes a normally open relay actuated switch 84 having one side connected to line 54 and the other to line 42 through lines 86 and 88. Switch 84 is adapted to be closed upon energization of relay coil 90 having one side connected to a contact strip 92 in mode selector unit 34 through line 94 and having the other side connected to ground through line 96, diode 98 and an interwiper switch 100. The B+ side of coil 90 is connected to line 58 through a diode 102. Interwipe switch 100 is mechanically interconnected with the windshield wiper blades drive mechanism 10 so that the switch is closed upon displacement of the mechanism from the rest position toward the extended position and is opened upon return of the mechanism to the rest position. The control circuit includes a resistance-capacitance timing circuit comprising a variable resistor or potentiometer and resistor 106 connected to line 42 in parallel with one another and connected in series to ground with resistor 108 and capacitor 110 in line 112. A diode 114 is in line 112 between resistor 108 and capacitor 110 for the purpose set forth hereinafter. A normally non-conducting transistor 116 is connected to line 112 through line 118 and resistor 120 and is connected to conduct between ground and line 122 which is connected to relay coil 90. Line 64 is connected to line 118 between transistor 116 and resistor 120 through diode 124 and resistor 126. The timing circuit and transistor 116 are operable as described hereinafter to control the delay period between succeeding oscillations of the windshield wiper blades when the probe selector switch 36 of mode selector 34 is in the PULSE mode position, as shown in FIG. 3b.

Referring to FIG. 2, for convenience of illustration, the mode selector control 34 is separated by broken line A from the remainder of the control circuitry. The mode selector control 34 is illustrated in FIGS. 32, 3b, 3c, 3d and 3e with the probe selector switch 36 in the positions of the MIST mode, PULSE mode, SLOW mode, FAST mode and WASH mode respectively.

Figure 3C:
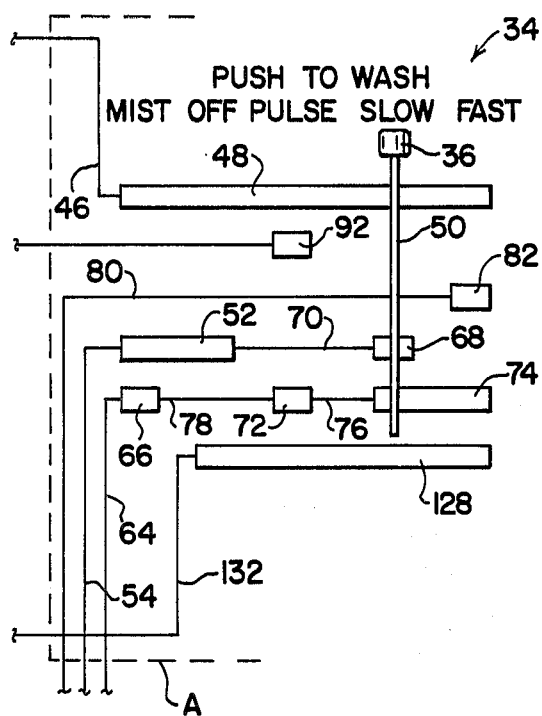
Figure 3D:
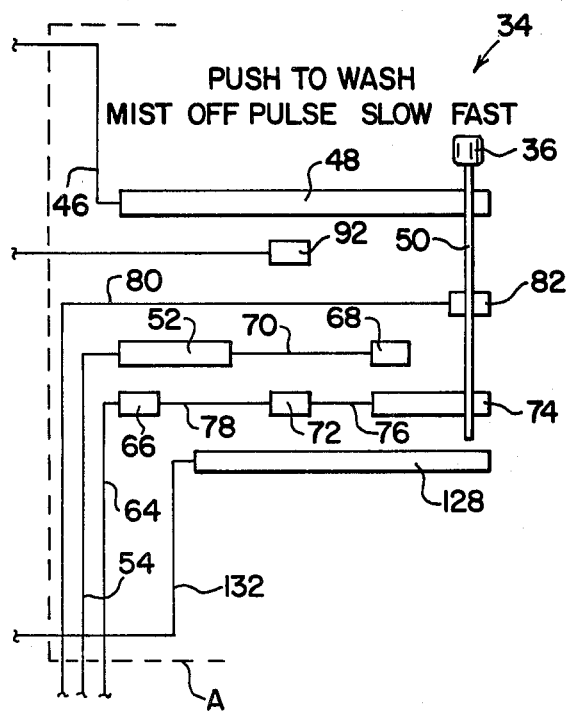
Figure 3E:
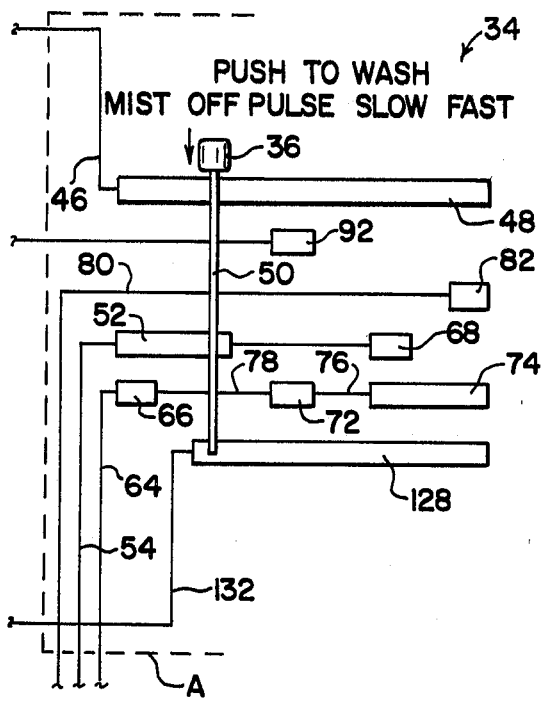

Mode selector control 34 further includes a contact strip 128 adapted to be engaged by the conductor stem 50 of mode selector probe switch 36 when the latter is displaced toward strip 128 as illustrated in FIG. 3e. Contact strip 128 is connected to a normally non-conducting transistor 130 through line 132 and resistor 134 therein, and transistor 130 is connected between ground and a transistor 136 by line 138 and resistor 140 therein. A capacitor 142 is connected between ground and line 138 at a location between resistor 140 and tansistor 130, and a diode 144 is connected between line 138 at the latter location and line 112 between resistor 108 and diode 114. A transistor 146 is connected to transistor 136 through line 148 and resistor 150 therein and is connected between ground and line 42 by means of line 152 and capacitor 154 in the latter line. Transistor 146 is also connected between ground and line 42 through a relay coil 156, and transistor 136 is connected to line 88 and thus line 42 through line 158. Relay coil 156 controls a normally open wash motor switch 160 adapted to be closed upon energization of coil 156. Wash fluid pump motor 26 is adapted to be connected to line 88 and thus line 42 by switch 160 through line 162 connected to one side of motor 26, and the other side of motor 26 is adapted to be connected to ground through interwipe switch 100. A diode 164 is connected to line 96 at a location between diode 98 and interwipe switch 100 and to line 112 at a location between capacitor 110 and diode 114. A transistor 166 is connected across lines 64 and 42 at a location in line 64 between diode 124 and relay 62 and at a location in line 42 between the connections of resistor 106 and capacitor 154 therewith. Transistor 166 is also connected to line 152 through a resistor 168 and at a location between capacitor 154 and transistor 146.

It will be appreciated from FIG. 2 and the component parts of the electrical control circuit described in connection therewith that when mode selector probe switch 36 is in the OFF position the circuits to park solenoid 62 and relays 90 and 156 and thus to blade 16 and wash pump motor 26 are open, and that the wiper blades are in the park position whereby interwipe switch 100 and park switch 56 are open. As will be seen from FIG. 3a, when mode selector switch 36 is displaced to the left from the OFF position, to the MIST position, the probe switch conductor stem 50 electrically connects conductor strips 48, 52 and 66, whereby park solenoid 62 is energized through line 64, contact strip 66, contact strip 48 and line 42. Energization of park solenoid 62 closes park switch 56, whereby the slow speed winding of wiper blade motor 16 is energized between ground and line 42 through lines 60 and 58, switch 56, line 54, contact strip 52, conductor stem 50 and contact strip 48. The MIST mode provides one cycle of wiper blade oscillation and, accordingly, it will be appreciated that displacement of mode selector switch 36 to the MIST position is against a return bias provided by a suitable spring, not shown, whereby the operator need only momentarily displace mode selector probe 36 to the MIST position and then release the selector for automatic return to the OFF position by the biasing spring. The one cycle of blade oscillation in the MIST mode is provided by the mechanical interlock between motor 16 and park switch 56 referred to hereinabove and which operates to hold park switch 56 in the closed position following de-energization of park solenoid 62. In the MIST mode, such de-energization occurs upon movement of conductor stem 50 back to the OFF position upon release of the mode selector component. Following the one cycle of blade oscillation and return of the blades to the rest position, the mechanical interlock operates to return the blades to the park position and to open park switch 56 to de-energize blade motor 16. Thus, in the MIST mode the wiper blades have an operating period of fixed duration determined by the time required for the blades to oscillate through one cycle.

As will be seen from FIG. 3c, when mode selector component 36 is displaced to the right from the OFF position to the SLOW position, park solenoid 62 is energized through line 64, contact strips 66, 72 and 74 and lines 76 and 78 therebetween, conductor stem 50, contact strip 48 and line 42, whereby park switch 56 closes. Upon closure of the latter switch, the slow speed winding of wiper blade motor 16 is energized through lines 60 and 58, switch 56, line 54, contact strips 52 and 68 and line 70 therebetween, conductor stem 50, contact strip 48 and line 42. In the SLOW mode of operation, the wiper blades continuously oscillate at a slow speed until such time as the operator displaces mode selector switch 36 back to the OFF position or to another mode position. When the selector is returned to the OFF position, the wiper blades complete the cycle of oscillation in which they are in and return to the park position through operation of the mechanical interlock between park switch 56 and motor 16 as described hereinabove. Thus, in the SLOW speed mode, the wiper blades have an operating period of a duration determined by the operator.

As will be seen from FIG. 3d, when mode selector probe switch 36 is displaced to the FAST position, park solenoid 62 is energized as described above in connection with FIG. 3c whereby park switch 56 closes to enable energization of blade motor 16. In the FAST mode, the fast speed winding of motor 16 is energized through line 80, contact strip 82, conductor stem 50, contact strip 48 and line 42, whereby motor 16 operates at high speed and the wiper blades are accordingly oscillated at high speed. Again, the wiper blades oscillate continuously until such time as the operator displaces mode selector component 36 to the OFF or another mode position and, as in the SLOW speed mode, when the selector switch 36 is returned to the OFF position the wiper blades complete the cycle of oscillation in which they are in at that time and return to the park position. As in the SLOW speed mode, the wiper blades have an operating period in the FAST mode of a duration determined by the operator.

As described hereinabove, the PULSE mode of wiper blade operation provides for the wiper blades to be intermittently oscillated through one cycle with a time delay between succeeding cycles of oscillation. In the PULSE mode, the wiper blades have an operating period between the beginning of one cycle of oscillation and the beginning of the succeeding cycle, the duration of which period is determined by the time required for the blades to oscillate through one cycle and the time of the delay period between the end of one cycle and the beginning of the next cycle. The manner in which intermittent blade oscillation is achieved and the manner in which the control circuit is operable to vary the delay period and thus vary the duration of the operating period in the PULSE mode in accordance with the present invention will be best understood with reference to FIGS. 2 and 3b. When the vehicle ignition is turned on, the windshield cleaning system is driven to a standby condition. Capacitor 110 is charged through diode 114, potentiometer 104 and resistors 106 and 108, whereby transistor 116 is biased to conduct to relay coil 90 when the circuit therefore is completed. When mode selector component 36 is displaced to the PULSE position, park solenoid 62 is energized through line 64, contact strips 66 and 72 and line 78 therebetween, conductor stem 50, contact strip 48 and line 42, whereby park switch 56 is closed. At the same time, the circuit for relay coil 90 is completed by the connection of conductor strips 92 and 48 through conductor stem 50, whereby relay coil 90 is energized by conduction of transistor 116 through lines 122 and 94, contact strip 92, conductor stem 50, contact strip 48 and line 42. Energization of relay coil 90 closes relay switch 84, whereby wiper blade motor 16 is energized at the slow speed thereof through lines 60 and 58, park switch 56, relay switch 84 and lines 86, 88 and 42. Initial wiper blade movement closes interwipe switch 100 which in turn discharges capacitor 110. The discharge of capacitor 110 turns transistor 116 off, thus disconnecting the circuit therethrough to relay coil 90. However, relay coil 90 remains energized, as the result of the closure of interwipe switch 100, through line 96, diode 98, line 94, contact strip 92, conductor stem 50, contact strip 48 and line 42. Thus, the wiper blades complete one cycle of operation and, upon return to the rest position, open the interwipe switch, whereby coil 90 is de-energized to open relay switch 84 and thus the circuit for wiper blade motor 16. Park solenoid 62 remains energized through the circuit therefor described above, whereby park switch 56 remains closed. Energization of park solenoid 62 provides for the mechanical interlock between the latter and blade motor 16 to stop the blades in the rest position when blade motor 16 is disconnected by opening of relay switch 84. Wiper blade motor 16 remains disabled until capacitor 110 is again charged to the threshold voltage of transistor 116, whereupon the latter is biased to conduct thus again completing a circuit for relay coil 90 through lines 122 and 94, contact strip 92, conductor stem 50, contact strip 48 and line 42. Completion of the latter circuit again energizes relay coil 90 to close relay switch 84, whereby blade motor 16 is energized to initiate blade movement and another oscillating cycle for the blades under the control of interwipe switch 100 as described hereinabove. The delay interval between the opening of relay switch 84 at the end of one cycle of blade oscillation and the energization of relay coil 90 to close switch 84 and initiate the subsequent cycle of oscillation is determined by the time constant provided by capacitor 110 and resistance of potentiometer 104 and resistors 106 and 108. Accordingly, it will be appreciated that the delay interval is adapted to be increased or decreased by adjusting potentiometer 104 through the manual control component 40 accessible to the vehicle operator. Accordingly, this enables adjustment of the duration of the operating period for the blades in the PULSE mode to achieve a frequency of blade oscillation most suitable for the weather conditions in which the vehicle is being operated. It will be appreciated that the foregoing intermittent cycling of the wiper blades in the PULSE mode continues until such time as the vehicle operator displaces the mode selector probe switch 36 to the OFF or another mode position.

FIG. 3e illustrates the mode selector 34 in a WASH mode condition. With mode selector probe switch 36 in the OFF position, the WASH mode is initiated by axial displacement of mode selector probe switch 36 so that conductor stem 50 engages contact strip 128. In the WASH mode, the wash fluid pump 24 is driven by pump drive motor 26 to dispense fluid onto outer surface of the windshield, and the amount of fluid dispersed is determined by the period of operation of motor 26. It is here assumed that the pump drive motor 26 is a constant speed motor. Displacement of mode selector 36 to the WASH position is a momentary displacement followed by return of the mode selector probe to the position shown in FIG. 2 such as by means of a biasing spring, not illustrated, associated with the mode selector probe. When the vehicle ignition is turned on placing the windshield cleansing system in a standby condition, capacitor 142 is charged through potentiometer 104, resistors 106 and 108 and diode 144, and the charge on capacitor 142 turns transistor 136 off. When mode selector probe 36 is displaced ductor stem 50 engages contact strip 128. Transistor 130 discharges capacitor 142, whereby transistor 136 is energized through resistor 140. Transistor 146 then conducts rendering transistor 166 conductive and charging capacitor 154. Conduction of transistor 146 also energizes relay coil 156 to close relay switch 160. Conduction of transistor 166 energizes park solenoid 62 to close park switch 56, and transistor 116 is rendered conductive as a result of the charge on capacitor 110 as described hereinabove in connection with the PULSE mode operation, whereby relay coil 90 is energized through line 122, diode 102, park switch 56, line 54, contact strip 52, conductor stem 50, contact strip 48 and line 42. Accordingly, relay switch 84 is closed whereby wiper blade motor 16 is energized at the slow speed thereof through park switch 56, relay switch 84, line 86 and line 88. Energization of motor 16 initiates wiper blade movement and, upon movement of the blades from the rest toward the extended position, interwipe switch 100 is closed, whereby wash fluid pump drive motor 26 is energized through the interwipe switch, relay switch 160, line 88 and line 42. Relay coil 156 remains energized until such time as capacitor 142 again charges to the off threshold voltage of transistor 136 at which time the latter transistor is de-energized, thus de-energizing transisitor 146 and relay coil 156 to open relay switch 160 and de-energize wash motor 26. It will be appreciated therefore that the duration of energization of fluid pump drive motor 26, and thus the operating period of the wash fluid pump and the quantity of wash fluid dispensed, is determined by the time constant of the resistance of potentiometer 104, resistors 106 and 108 and the capacitance of capacitor 142. Therefore, it will be further appreciated that the amount of washer fluid used in one WASH mode cycle is adapted to be increased or decreased by adjusting potentiometer 104 through the manual control component 40 accessible to the vehicle operator. Accordingly, this enables the quantity of fluid dispensed during the WASH cycle to be controlled by the operator of the vehicle.

As mentioned above, a WASH cycle is initiated by momentary displacement of mode selector probe switch whereby conductor stem 50 engages contact strip 128. It will be appreciated that mode selector component 36 is in the position illustrated in FIG. 3e to initiate the WASH mode cycle and is returned to the OFF position as illustrated in FIG. 2 upon release of the probe by the operator. Following the wash fluid dispensing operation, the control circuit provides for the windshield wiper blades to continue to oscillate through an afterwipe cycle to complete the windshield cleaning operation. In this respect, again referring to FIGS. 2 and 3e, when transistor 146 is turned off at the end of the wash fluid dispensing operation as described above, transistor 166 is held on by the charge on cpacitor 154. Transistor 166 in turn holds transistor 116 on whereby relay coil 90 remains energized through line 122, diode 102, switches 56 and 84 and lines 86 and 88. Thus, wiper blade motor 16 remains energized to continue to actuate the wiper blades. When capacitor 154 discharges to the threshold voltage of transistor 166, the latter transistor is turned off and in turn turns off transistor 116. Relay coil 90 then remains energized for completion of the oscillating cycle in which the blades are in through interwipe switch 100, line 96, diodes 98 and 102, switches 56 and 84, and lines 86 and 88. Park switch 56 remains closed as a result of the mechanical interlock between the latter and motor 16 as described hereinabove. When the wiper blades return to the rest position, interwipe switch 100 opens whereby relay coil 90 is de-energized and relay switch 84 opens. The opening of switch 84 breaks the circuit for motor 16 through lines 86 and 88 to line 42, but when mode selector component 36 is in the OFF position, motor 16 is still in circuit through park switch 56, line 54, contact strip 52, conductor stem 50, contact strip 48 in line 42, until the mechanical interlock between the park switch and motor operates to open park switch 56. Accordingly, at the end of the afterwipe operation the blades are returned to the park position.

While the WASH mode has been described hereinabove in connection with the mode selector component in the OFF position, it will be appreciated that the actuation of wash fluid pump drive motor 26 for the dispensing of wash fluid in the manner described can be achieved with the mode selector component in the PULSE, SLOW or FAST mode position, and that the operation of the wiper blades following wash fluid dispensing will be that provided by the control circuit when the mode selector is in the PULSE, SLOW or FAST mode position.

While considerable emphasis has been placed herein on the preferred embodiment and especially the fact that the windshield cleaning system includes a MIST and both PULSE and WASH modes of operation, it will be appreciated that the system can include the PULSE and WASH modes without a MIST mode and, just as importantly, can include one of the PULSE and WASH modes without the other. Further, it will be appreciated that the system can employ a wiper blade drive which provides for oscillation of the wiper blades between positions corresponding to the rest and extended positions described herein and without the provision of a park position into which the blades are displaced upon termination of a cleaning operation. Still further, while the mode selector component is illustrated as being slidably displaceable between the selectable mode positions and axially displaceable to achieve a wash fluid dispensing operation, it will be appreciated that a mode selector control having a rotating, pivotal or other motion characteristic, or a combination of different motion characteristics can be employed in connection with components corresponding to the contact strips disclosed herein to achieve appropriate operation of the system in a selected mode position. Similarly, while the actuating component for varying the delay time in the PULSE mode and the duration of energization of the pump motor in the WASH mode is illustrated as being rotatable, it will be understood that the latter component could be linearly slidable or pivotal and, while shown as a separate component from the mode actuator component, could be operationally associated with the latter.

Figure 4:
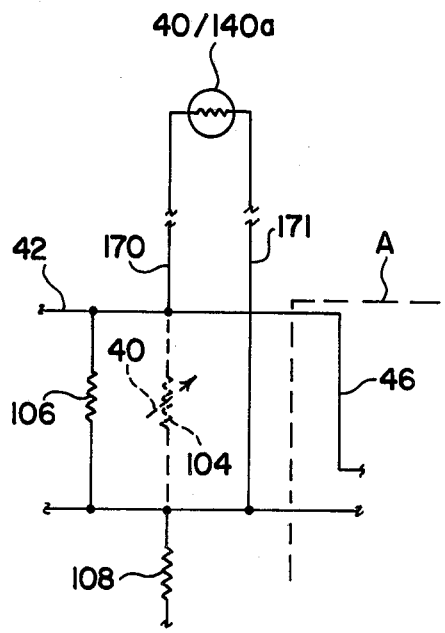

Referring now to FIG. 4, a photo sensitive device 40/104a such as a photo detector which changes its resistance characteristics in accordance with the amount of light received by such component, may be substituted in the control circuit for the variable resistor or potentiometer 104/40, shown in broken line form. By calculating the time constant of the timing circuit at the shortest time interval when the photo detector senses at least a predetermined light value, then as the light value detected by the photo sensitive device coming through the windshield falls below such predetermined minimum value due to, for example, dirt on other foreign matter on the windshield, the time interval timed by the timing circuit will increase in accordance with such decrease in light value sensed.

A similar circuit arrangement could be used to control the speed of a variable speed pump drive motor.

These and other changes in the preferred embodiment, as well as other embodiments of the invention, will be suggested or obvious to those skilled in the art upon reading the disclosure, whereby it is to be distinctly understood that the foregoing descriptive matter is to be interpreted merely as illustrative of the present invention and not as a limitation.

It will be appreciated that the above description assumes that the wash pump drive motor 26 is a constant speed motor and that the pump, when being driven by the motor, dispenses washer fluid at a substantially constant rate. Thus, the amount of washer fluid dispensed during any single WASH cycle is a function of the running time of the drive motor. Alternatively, the drive motor for the pump could be a variable speed motor. In such event the duration of the pump driving period may be a set interval of time and the quantity of fluid dispensed may be a function of the speed of the drive motor. Thus, instead of controlling the time of energization of the pump drive motor, the operator could control the quantity of fluid dispensed by controlling the speed of the pump drive motor. This may be accomplished by making the drive power variable, by the operator, such as by varying a potentiometer in the power input line of the variable speed drive motor.

It will further be appreciated that the time interval for driving a constant speed pump drive motor and/or the speed of a variable speed pump drive motor may be controlled automatically for example, by an electrical component having variable resistance characteristics which vary in response to certain predetermined conditions. Such electrical component is a photo-sensor or photo-detector which may change resistance in response to the amount of light falling on the light sensitive surface.

What is claimed is:

1. A windshield cleaning system comprising drivable windshield cleaing means including blade means and wash fluid pump means, first and second motor means for respectively driving said blade means and said pump means, motor control circuit means including power supply means and manually positionable means for connecting said motor means across said power supply means for providing a selected one of a plurality of selectable driving modes for said drivable means, said modes including a wash mode in which both said first and second motor means are connected across said power supply, said blade means and said pump means in said wash mode each having a corresponding operating period, said motor control circuit means including timing means operable in said wash mode for determining the duration of said operating period for said pump means independent of said operating period for said blade means in said wash mode, and means for adjusting said timing means for varying said duration of said operating period of said pump means in said wash mode.

2. A windshield cleaning system as in claim 1 and in which said cleaning system further includes reservoir means for holding a supply of fluid, said pump means having an input and an output said input coupled to said reservoir for receiving said fluid therefrom, said output for dispensing said fluid upon said windshield, said second motor means being connected between said power supply and a return for driving said pump means and, said means for adjusting said timing means being interposed in the power supply connection for said second motor means for varying the characteristics of said said motor means for varying the amount of fluid dispensed upon said windshield.

3. A windshield cleaning system comprising drivable windshield cleaning means, motor means for driving said drivable means, motor control circuit means including power supply means and manually positionable means for connecting said motor means across said power supply means for providing a selected one of a plurality of selectable driving modes for said drivable means, said drivable means in each said driving mode having an operating period, said plurality of driving modes includes a wash mode and said cleaning system includes blade means, blade drive means connected to said power supply to drive said blade means, a reservoir means for holding a supply of fluid, pump means having a drive, an input and an output, said input coupled to said reservoir for receiving said fluid therefrom, said output for dispensing said fluid upon said windshield, pump drive means connected to said drive of said pump means connected between said power supply and a return for driving said pump drive means, and means interposed in the power supply connection for driving said pump drive means for varying the characteristics of said pump drive means independently of said blade drive means for varying the amount of fluid dispensed upon said windshield.

4. A windshield cleaning system as in claim 3 and in which said means interposed in said power supply connection for varying the characteristics of said pump drive means is a timing circuit for timing the drive time of said pump drive means.

5. A windshield cleaning system as in claim 3 and in which said means interposed in said power supply connection for varying the characteristics of said pump drive means in a power restrictive means for varying the speed of said pump drive means.

6. A windshield cleaning system as in claim 4 and in which said timing circuit is a resistive-capacitive timing circuit and at least one of the components of said timing circuit is adjustable.

7. A windshield cleaning system as in claim 6 and in which the adjustable component of said timing circuit is a variable resistance.

8. A windshield cleaning system as in claim 7 and in which the said variable resistance is manually variable.

9. A windshield cleaning system as in claim 7 and in which the said variable resistance varies its characteristics in accordance with the amount of light passing through said windshield.

10. A windshield cleaning system as in claim 5 and in which said power restrictive means includes at least a resistance component and said resistance component is adjustable.

11. A windshield cleaning system as in claim 10 and in which said resistance component in said power restrictive means is manually adjustable.

12. A windshield cleaning system as in claim 10 and in which said resistance component in said power restrictive means varies its characteristics in accordance with the amount of light passing through said windshield.

13. A windshield cleaning system according to claim 1, wherein said pump means includes a windshield washer fluid pump and said second motor means includes a pump motor for driving said pump, said operating period for said pump means in said wash mode including a time period during which said pump motor is energized, and said timing means being adjustable to vary the length of said time period.

14. A windshield cleaning system according to claim 1, wherein said selectable driving modes further includes a blade pulse mode in which only said first motor means is connected across said power supply, said first motor means being intermittently energized in said pulse mode with a time delay period between successive energizations thereof, and said timing means in said pulse mode being adjustable to vary the length of said time delay period.

15. A windshield cleaning system according to claim 14, wherein said timing means includes resistance-capacitance timing circuit means operable in each said pulse and wash modes.

16. A windshield cleaning system according to claim 15, wherein said timing circuit means includes resistance means including a potentiometer common with respect to varying both said delay period and said operating period of said pump means, and first and second capacitors each in circuit with a corresponding one of said first motor means and said second motor means.

17. A windshield cleaning system including wiper blade means, first electric motor means for oscillating said blade means relative to a vehicle windshield, windshield washer fluid pump means and second electric motor means for driving said pump means to dispense washer fluid from a reservoir therefore onto said windshield, motor control circuit means including manually positionable means for connecting said first and second motor means to a source of power to provide a wash mode of operation in which said first motor means is operable to oscillate said blade means and said second motor means is operable to drive said pump means to dispense washer fluid onto said windshield, said motor control circuit means including means operable in said wash mode for changing the characteristics of said second motor means independent of said first motor means, and means for varying said characteristic changing means for varying the amount of washer fluid dispensed onto said windshield by said pump means.

18. A windshield cleaning system according to claim 17, wherein said motor control circuit means includes an electrically actuated control switch for said second motor means having open and closed modes, said second motor means being operable when said control switch is closed, and said characteristic changing means is a timing means for determining the duration of closure of said control switch.

19. A windshield cleaning system according to claim 18, wherein said timing means includes a capacitor and said motor control circuit means includes means connecting said capacitor in circuit with said control switch, said control switch being open when said capacitor is charged and closing in response to discharge, and said means connecting said capacitor in circuit with said control switch including means for discharging said capacitor in response to displacement of said manually positionable means to provide said wash mode.

20. A windshield cleaning system according to claim 18, wherein said timing circuit means includes resistance means including manually adjustable resistance means for determining the time required for charging said capacitor and thus the duration of energization of said second motor means.

* * * * *